United States Patent
Gerbarg et al.

(10) Patent No.: US 12,411,673 B2
(45) Date of Patent: Sep. 9, 2025

(54) PAGE-IN LINKING

(71) Applicant: Apple Inc., Cupertino, CA (US)

(72) Inventors: Louis G. Gerbarg, Saratoga, CA (US);
Joseph J. Bonasera, San Francisco, CA (US); Davide Italiano, San Francisco, CA (US); Nick Kledzik, Cupertino, CA (US); Peter Cooper, San Jose, CA (US); Mohamadou A. Abdoulaye, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 10 days.

(21) Appl. No.: 18/167,001

(22) Filed: Feb. 9, 2023

(65) Prior Publication Data
US 2023/0393824 A1 Dec. 7, 2023

Related U.S. Application Data

(60) Provisional application No. 63/365,861, filed on Jun. 4, 2022.

(51) Int. Cl.
*G06F 8/54* (2018.01)

(52) U.S. Cl.
CPC ...................... *G06F 8/54* (2013.01)

(58) Field of Classification Search
CPC ........................................................ G06F 8/54
See application file for complete search history.

(56) References Cited

U.S. PATENT DOCUMENTS

| | | | | |
|---|---|---|---|---|
| 5,579,520 A * | 11/1996 | Bennett | ................... | G06F 8/443 717/133 |
| 6,542,167 B1 * | 4/2003 | Darlet | ................. | G06F 9/44521 715/826 |
| 9,880,835 B2 * | 1/2018 | Gschwind | ................. | G06F 8/70 |
| 2002/0087956 A1 * | 7/2002 | Darlet | ................. | G06F 9/44521 717/159 |
| 2003/0122871 A1 * | 7/2003 | Darlet | ................. | G06F 9/44521 715/762 |

(Continued)

FOREIGN PATENT DOCUMENTS

| | | | | | |
|---|---|---|---|---|---|
| CN | 108090361 A | * | 5/2018 | .......... | G06F 21/577 |
| WO | WO-2016162075 A1 | * | 10/2016 | ............... | G06F 8/36 |
| WO | WO-2022093186 A1 | * | 5/2022 | | |

*Primary Examiner* — Qing Chen
(74) *Attorney, Agent, or Firm* — Kilpatrick Townsend & Stockton LLP

(57) ABSTRACT

A dynamic linking system can be designed to dynamically resolve symbol references of pages associated with executable code as the pages are paged into virtual memory. The operating system can include a dynamic linker that uses metadata in the pages to determine symbol references that reference other code or values. Other code can include code in shared libraries. The dynamic linker can generate a data structure containing the symbol references in a small and dense format. The dynamic linker can send the data structure and other relevant data to the kernel once the symbol references have been identified. The kernel can perform the functions related to resolving the symbol references. For example, the kernel can resolve the symbol by determining a pointer value for the symbol, wherein the pointer value can be used to point to code or values. The kernel can resolve the symbol references and store the data structure, which contains the resolved symbol references.

20 Claims, 9 Drawing Sheets

(56) References Cited

U.S. PATENT DOCUMENTS

| | | | |
|---|---|---|---|
| 2004/0187130 A1* | 9/2004 | Koning | G06F 9/44521 |
| | | | 718/100 |
| 2008/0005719 A1* | 1/2008 | Morris | G06F 8/41 |
| | | | 717/100 |
| 2012/0222025 A1* | 8/2012 | Pandit | G06F 8/658 |
| | | | 717/170 |
| 2019/0317740 A1* | 10/2019 | Herr | G06F 8/41 |
| 2022/0121457 A1* | 4/2022 | Weimer | G06F 8/433 |

* cited by examiner

700 rebase information:

| segment section | address | type | value |
|---|---|---|---|
| __DATA __data | 0x100008008 | pointer | 0x100007F94 with value 0x0008000100007F94 |
| __DATA __data | 0x100008010 | pointer | 0x100008018 with value 0x0000000100008018 |

712

710 bind information:

| segment section | address | type | addend | dylib | symbol |
|---|---|---|---|---|---|
| __DATA __data | 0x100008000 | pointer | 0 | libSystem | printf with value |

0x4008000000000000
no compressed rebase info

714

720 opcodes
0x0000 BIND_SUBOPCODE_THREADED_SET_BIND_ORDINAL_TABLE_SIZE_ULEB(1)
0x0002 BIND_OPCODE_SET_DYLIB_ORDINAL_IMM(2)
0x0003 BIND_OPCODE_SET_SYMBOL_TRAILING_FLAGS_IMM(0x00, printf)
0x000C BIND_OPCODE_SET_TYPE_IMM(1)
0x000D BIND_OPCODE_DO_BIND()
0x000E BIND_OPCODE_SET_SEGMENT_AND_OFFSET_ULEB(0x02, 0x00000000)
0x0010 BIND_SUBOPCODE_THREADED_APPLY
0x0011 BIND_OPCODE_DONE

FIG. 7

PAGE-IN LINKING

FIELD

The present disclosure relates generally to techniques for dynamic linking of symbol references by an operating system.

BACKGROUND

Some operating systems in computing devices use dynamic linkers to resolve links (which can also be referred to as symbols or symbol references) to external libraries needed by executable code at run-time. Operating systems can also include virtual memory systems. Both the virtual memory systems and dynamic linkers incur memory costs and computational costs when executing code at runtime. Accordingly, it is desirable to provide improved systems to enhance the performance of computing devices.

BRIEF SUMMARY

Parts of an operating system can be designed to dynamically resolve symbol references of pages associated with executable code as the pages are paged into virtual memory. The operating system can include a dynamic linker that uses metadata in the pages to determine symbol references that reference other code or values. Other code can include code in shared libraries. The dynamic linker can generate a data structure containing the symbol references in a small and dense format. The dynamic linker can send the data structure and other relevant data to the kernel once the symbol references have been identified. The kernel can perform the functions related to resolving the symbol references. For example, the kernel can resolve the symbol by determining a pointer value for the symbol, wherein the pointer value can be used to point to code or values. The kernel can resolve the symbol references and store the data structure, which contains the resolved symbol references.

In one example, a method is performed by a computing device, an indication that a page of executable code has moved into process memory can be received. The page can include unresolved symbol references to external libraries. The process memory can be a part of system memory. System memory can include a kernel space associated with a kernel of an operating system executing on the computing device. In response to receiving the indication, resolution data for the unresolved symbol references to external libraries in the page can be generated. The resolution data for the unresolved symbol references to external libraries in the page can be sent to the kernel. The kernel can generate resolved symbol references by resolving the unresolved symbol references to external libraries in the page based on the resolution data.

These and other embodiments of the disclosure are described in detail below. For example, other embodiments are directed to systems, devices, and computer readable media associated with methods described herein.

A better understanding of the nature and advantages of embodiments of the present disclosure may be gained with reference to the following detailed description and the accompanying drawings.

BRIEF DESCRIPTION OF THE DRAWINGS

FIG. 7 illustrates a diagram for describing the techniques described herein, according to an embodiment of the present disclosure.

DETAILED DESCRIPTION

Figure 1:
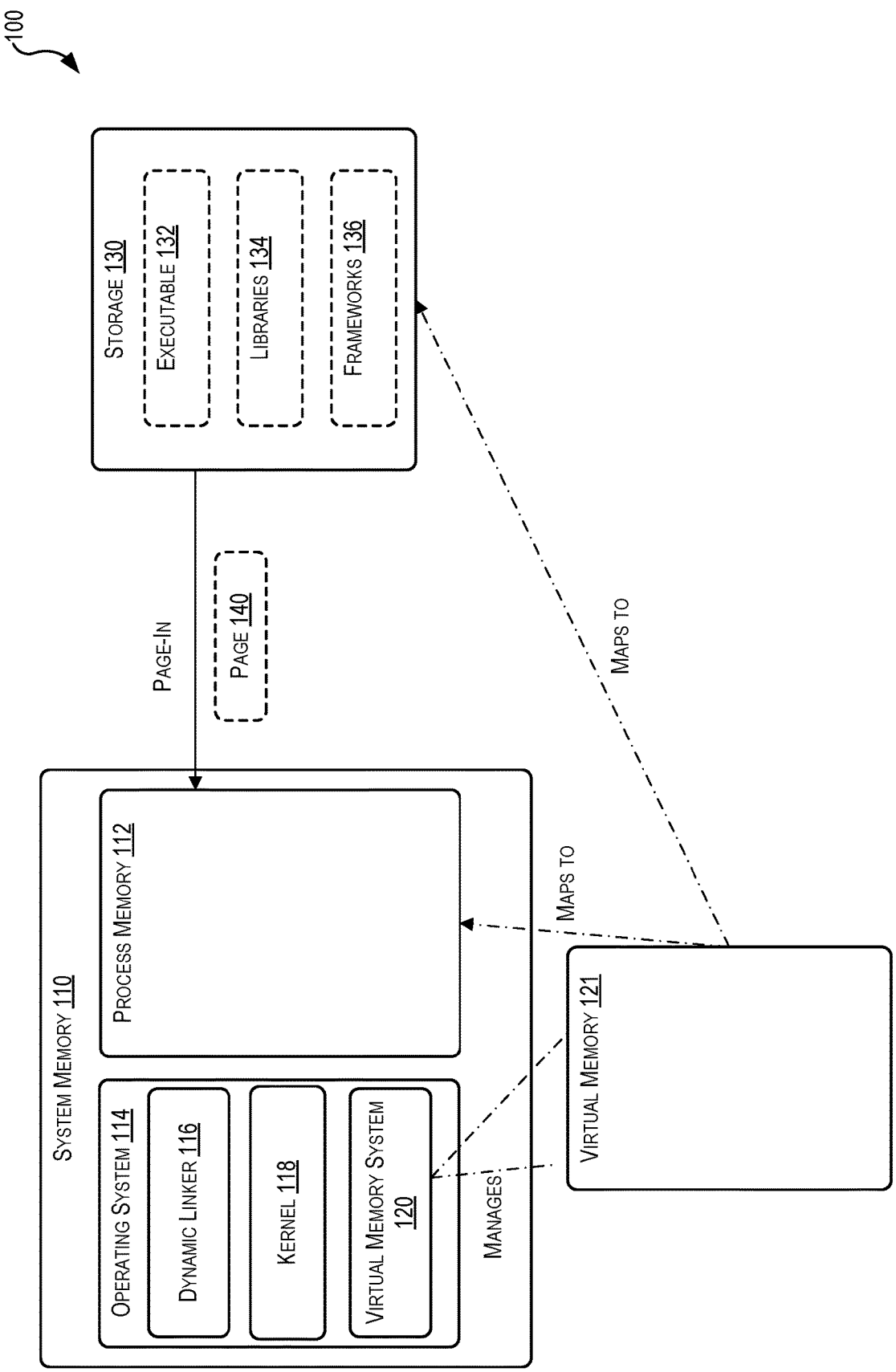
FIG. 1 illustrates a block diagram for illustrating the techniques described herein, according to an embodiment of the present disclosure.

Certain implementations are directed to techniques (for example, a device, a method, a memory or non-transitory computer readable medium storing code or instructions executable by one or more processors) for page-in linking. Page-in linking refers to the resolution of symbol references in pages of executable code as the pages are brought into process memory, e.g., when a given page of code is brought into process memory. The symbol references are resolved to symbol definitions. Bringing a page of executable code into process memory can be referred to as a "page-in." Page-in linking can involve steps performed by a dynamic linker and a kernel of an operating system. For example, a table of unresolved symbol references can be stored and maintained in the kernel and page-in linking allows the kernel to resolve the symbol references to symbol definitions when pages of executable code are paged-in.

In some situations, symbol references for all pages of a process are resolved when a process is started. The dynamic linker determines that one or more pages of a process have symbol references which need to be resolved. The pages are paged into process memory and the symbol reference is resolved to a symbol definition which can be a pointer value to a function, method, or value of a shared library, or any part of process memory, and the pointer is stored in process memory. In resolving symbol references upon start-up of a process, the process uses up process memory and creates dirty memory. Dirty memory refers to parts of process memory that have had their contents modified, but the modifications have yet to be saved to storage. In some situations, now that the symbol reference is resolved, the operating system may need to hold the page containing the symbol reference in process memory for the process's lifetime, thus creating dirty memory. In some situations, now that the symbol reference is resolved, the operating system may need to hold, in system memory, the page with the symbol definition (for example, the symbol definition to which the symbol reference resolves) for the process's lifetime, thus creating dirty memory.

The benefits of page-in linking include 1) reducing the amount of process memory used by processes upon start-up of a process, and 2) reducing the amount of dirty memory a process may create in process memory. Page-in linking enables on-demand resolution of symbol references at any time while a process is running, as opposed to at start-up of the process. If a symbol reference can be resolved on-demand as pages are paged into process memory, then not every unresolved-symbol-reference-containing page of a process needs to be paged in upon start-up of a process. Rather, pages can be paged-in as needed and symbol references can be resolved on-demand thus reducing the amount of process memory (as well as other computing resources such as buses and instruction cycles) used by processes upon start-up. Similarly, when symbol references can be resolved on-demand as pages are paged into memory, then the operating system can reclaim the process memory used by pages of the process that have symbol references because the symbol references of that page can be resolved again if that page is needed. This reduces the amount of dirty memory a process creates in process memory because the operating system is able to reclaim the process memory as needed. This has the additional effect of reducing the amount of memory a process may need in process memory.

Other benefits of page-in linking include when a page is paged out the kernel can use stored information to resolve the symbol references again when the page is paged-in again (the symbol references having been thrown out when the page was paged out) and create the links. A benefit of reducing the amount of process memory a process uses can be realized because the resolved symbol references are stored in the kernel space of system memory and not in user space (or process memory) of system memory. Thus, as pages are paged-out, some information (e.g., table of pointers) related to the page can still be stored in system memory. Another benefit is realized by having symbol references resolved by the kernel, which does not create dirty memory because the kernel can resolve the same symbol reference multiple times as the corresponding page is paged-in and paged-out as needed by the system. In some situations, no data from the original page-in (prior to the page-out) needs to be persisted to disk. Another benefit is realized because the pages can be dynamically page-in as the associated code is needed, as opposed to needing to page-in all code upon start-up in case the code on any page is needed. As such, such page-in linking can provide on-demand, dynamic linking of symbol references when pages are paged-in (for example, by the kernel).

Page-in linking can be described as an on-demand infrastructure that doesn't require all symbol references to be resolved upon start-up of an application. For example, a social media application may have significant amounts of functionality such as a QR code reader. However, the QR code reader may be used infrequently. In some implementations, all symbol references of all pages, including the pages invoking the QR code reader (which may include resolution of symbol references to code, functions, or symbols in external libraries and/or frameworks), will need to be resolved (also referred to as linked) at start-up of the social media application because the symbol definitions associated with the symbol references might get called at some point during the process's lifetime. On-demand infrastructure can minimize both memory and processing costs by allowing the symbol references on a page associated with the QR code reader not to be resolved upon start-up, but rather only if the page of the QR code reader is required. On-demand infrastructure can avoid bringing in some pages upon start-up of an application and thus avoid using process memory unnecessarily. On-demand infrastructure can also avoid the processing and other costs associated with the I/O transactions to a controller (e.g., a NAND controller) and bringing in the pages from the disk.

The on-demand infrastructure can include the dynamic linker handing down the list of symbol references to the kernel to be resolved and then stored in kernel-related wired memory. In some implementations, the dynamic linker creates a data structure that includes the list of symbol references and placeholders for the pointer values (which can be referred to as symbol definitions) associated with the symbol references once the symbol references are resolved. In some implementations, the kernel creates the afore-mentioned data structure when resolving the list of symbol references. Kernel-related wired memory can refer to memory that the kernel keeps in system memory, for example, as long as the related process is still running. Kernel-related wired memory can be a limited resource. As such, the information handed down regarding the symbol references to be resolved should be compact to reduce the costs associated with using kernel-related wired memory. Many methods can be used to create the compact data structure storing the lists of symbol references and all other important information of the symbol references. Overall, various embodiments of page-in linking allow for large memory and computational savings through the use of kernel-related wired memory.

In some implementations, the compact data structure of the list of symbol references can be generated based at least on metadata associated with the pages. When the pages are created (for example, in user space), metadata can be saved to assist in the resolution of the symbol references (for example, by the kernel). The metadata can be stored with the page with the symbol references. The metadata can be associated with the page, and/or a property of the page. This metadata can be used to create the data structure of the symbol references. The data structure of the references to symbol references can include a table of symbol names and a linked list of pointers to be used for resolution of the symbol (also referred to as symbol definitions). The table of symbol names and the linked list of pointers allows for the resolved symbol references to be stored in an ultra-memory-dense format, thus enabling the ability for the resolved symbol references to be stored in the kernel and kernel-related wired memory.

In some implementations, the table of symbol names and the linked list of pointers (or, in some implementations, a placeholder for the linked list of pointers) can be handed down to the kernel. The kernel can then resolve the symbol references by determining the associated pointer values, which allows for dynamic linking as pages are paged-in to virtual memory. Once the dynamic linker identifies the unresolved symbol references of the page, the DYLD can provide to the kernel the following information: 1) the table of symbol names, and 2) a linked list for resolution of the symbol references. The kernel can then resolve the symbol names to create the links and store those links in kernel-related wired memory. In some implementations, the dynamic linker identifies the unresolved symbol references upon start-up of the process. In some implementations, the dynamic linker identifies the unresolved symbol references as, or just prior to, the corresponding page being paged-in to process memory.

Below are described techniques that describe page-in linking which can 1) reduce the significant process memory and computational costs upon start-up and 2) reduce the dirty memory of many dynamic linking systems.

I. Dynamic Linking

In some implementations, a linker (for example, a static linker or a dynamic linker) can combine one or more object files generated by a compiler into an executable file associated with an application. The executable file can be divided into pages of executable code, which can be brought into process memory as needed to run the application associated with the executable code. These pages will have 1) symbol references which reference other code (for example, variables, functions, and the like) in the executable and 2) symbol references which reference outside code such as code in libraries or frameworks. Symbols can include objects, variables, data, pointers, functions.

Symbol references in the executable may need a rebase operation to resolve the symbol references (for example, creating a link between the symbol references and the symbol definitions). Some symbol references may reference external libraries or frameworks (for example, shared libraries) may need a bind operation to resolve the symbol references. In some implementations, the dynamic linker running in user space (also referred to as process memory), can a) identify the unresolved symbol references of pages of executable code and then b) resolve the symbol reference to a symbol definition. For example, resolving a symbol reference to a symbol definition can include identifying and determining a pointer to the symbol definition and then associating that pointer with the symbol name. In some implementations, a page with resolved symbol references cannot be paged out which creates dirty memory. A "page-out" refers to moving the page of executable code to storage (for example, disk, hard drive, or solid state drive).

Many methods for dynamic linking of unresolved symbol references incur significant memory costs and computational costs upon start-up of a process (for example bind operations and rebase operations). Similarly, many methods of dynamic linking of symbol references incur memory costs (for example, requiring the system to maintain dirty memory). Oftentimes dirty memory gets attributed to third-party applications (third-party in the sense that they are not developed by the operating system's developer). The third-party application, especially large applications, would like to minimize the creation of dirty memory attributed to the application to reduce potential performance loss. Similarly, operating system developers want to reduce dirty memory in order to increase performance of processes.

FIG. 1 shows several components of an example system that enables dynamic linking, and particularly page-in linking. On a user device or computing device, there can be system memory 110 (for example, RAM), which is comprised of process memory 112 and memory allocated to the operating system 114.

In FIG. 1, the operating system 114 can include at least a dynamic linker 116, a kernel 118, and a virtual memory system 120 that manages virtual memory 121. The operating system 114, dynamic linker 116, and the kernel 118 are components that help the computing system run programs and applications. The virtual memory system 120 manages memory using virtual memory 121. Virtual memory is well understood to be a method and system in many computing systems. The virtual memory 121 maps to process memory 112 and storage 130 (for example, disk or hard drive).

Storage 130 can include data and code such as the executable 132 (also referred to as executable code), libraries 134, and frameworks 136. When code and/or data is needed by the system, the code and/or data can be brought into process memory 112. Code and/or data is brought into process memory 112 in the form of pages, such as page 140 of FIG. 1. Pages can be a fundamental unit of memory. In some implementations, pages can be 4 kilobytes or 16 kilobytes. Brining code and/or data into process memory can be referred to as a page-in. For example, a process may start on the system that requires code and/or data from the executable 132 and code and/or data from one or more libraries 134. The pages with the required code and/or data is paged into process memory 112 from storage 130. Of note in FIGS. 1-3 and 5, the dotted line boxes generally refer to software or code while solid line boxes refer to systems, modules, and/or parts system.

Figure 2:
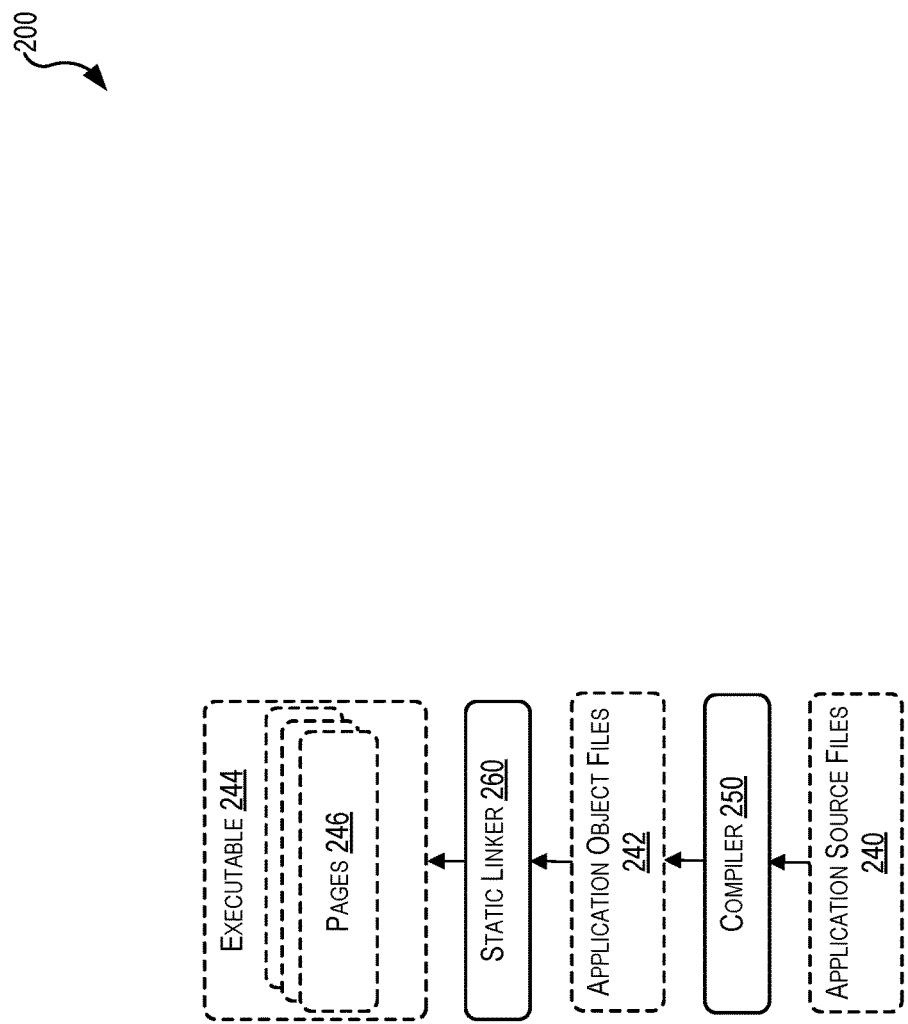
FIG. 2 illustrates a block diagram for illustrating the techniques described herein, according to an embodiment of the present disclosure.

One of the functions of the virtual memory 121 can be to manage process memory 121 for processes and execute processes, such as processes of third-party applications developed by developers other than the developers of the operating system 114. With reference to FIG. 2, these applications (and their associated processes) are associated with application source files 240 that can be compiled by a compiler 250 to create application object files 242. The application source files can correspond one-to-one the application object files in some configurations. The application object files 242 can be linked by use of a static linker 260 to form an executable 244 (which corresponds to the executable 132 of FIG. 1). Other systems, programs, or components can also be involved in the generation of the executable 244. The executable 244 can be divided up into units of code called pages 246. Pages of code can be of various sizes as dictated by the static linker 260, compiler 250, or other systems involved in generating the executable 244 and the associated pages 246. The pages 246 can have a maximum size as determined by system characteristics. For example, the pages can have a maximum size of four kilobytes. The division of code in the pages 246 can be based on grouping associated code.

One of the operations of the static linker 260 can be to identify all the symbol references in the application object files 242. Symbol references can be any of the following: an object, variable, data type, function, method, script, and the like in the application object files 242. The static linker 260 can examine the symbol references to determine if the application object files 242 provides implementations for all the identified symbol references. The static linker 260 can examine the symbol references to try to resolve any symbol references to symbol definitions. Some symbol references can be references to other parts of the executable 244 (for example, the corresponding symbol definition can be located on the same page or on another page of the pages 246) and some symbol references can be references to libraries and/or frameworks, for example external libraries and/or frameworks. The static linker identifies that these symbol references need to be resolved when the pages are loaded into process memory such that the proper code is called (by using the symbol definition) when the code corresponding to the symbol reference is executed. Resolving a symbol reference to other parts of the executable can be referred to as a rebase operation and resolving a symbol reference to an external library and/or framework can be referred to as a bind operation. Generally, a library includes an implementation of the symbol (for example, the library has the symbol definition) while a framework is a guarantee that there will be an implementation of the symbol (for example, the framework guarantees that there exists a symbol definition).

For example, the static linker 260 may identify a function called foo. Foo can be a symbol reference. In the implementation of the function foo, it may call another function called bar. Bar can also be a symbol reference. The static linker 260 can examine all the application object files 242 according to a predefined search order to determine the location of the implementation of the function bar. If the static linker 260 identifies that the function bar is implemented in the application object files 242, then, in some implementations, the static linker 260 can resolve the symbol reference of bar and create a link (for example, by resolving the symbol reference and/or identifying the symbol definition) between the foo function and the bar function. However, the static linker 260 may determine that the function bar is not defined in any application object files 242. In some implementations, the static linker 260 can then leave metadata on the page associated with the function foo and the call for the function bar that indicates that the symbol reference for the function bar needs to be resolved (for example, by the dynamic linker 116 or the kernel 118 of FIG. 1). In some implementations, the static linker 260 can search frameworks and/or libraries for the implementation of the function bar. If the static linker 260 identifies the function bar in a framework and/or library, the static linker 260 can create the link (for example, by resolving the symbol reference and/or identifying the symbol definition) between the function foo and the function bar. In some implementations, the static linker 260 can instead leave metadata on the page associated with the function foo and the call for the function bar that indicates that the symbol reference for the function bar needs to be linked or resolved (for example, by the dynamic linker 116 or the kernel 118 of FIG. 1).

Once the static linker 260 has created the executable 244 and the executable 244 has been divided into associated pages 246, the pages 246 wait to be called into process memory (for example, the process memory 112 of FIG. 1). With reference to FIG. 1, a page 140 can be called into process memory 112 when the application needs the associated code. This is known as a page-in. When the page 140 is paged-in, in some implementations, the dynamic linker 116 can resolve any unresolved symbol references located on the page 140. In some implementations, all unresolved symbol references can be references to external libraries and/or frameworks (for example, libraries 134 and frameworks 136). In some implementations, unresolved symbol references can include references to external libraries and/or frameworks, and references to other parts of the executable 132.

In some implementations, the dynamic linker 116 does not completely resolve the unresolved references. The dynamic linker 116 can identify the unresolved symbol references and create a data structure to store the names of the symbols and the associated links (also referred to as symbol definitions) to resolve the unresolved symbol references. In some implementations, the dynamic linker 116 can then resolve the unresolved symbol references. The dynamic linker 116 can identify a library/framework associated with the unresolved symbol. The dynamic linker 116 can then provide and store a pointer to the corresponding code that resolves the unresolved symbol.

For example, page 140 may include a symbol reference to a function printf. The page 140 may have a printf stub function that loads a printf pointer. The dynamic linker 116 can identify that this printf pointer needs to be resolved to the printf function contained in a library. The dynamic linker 116 can find the address of printf and the dynamic linker 116 can stamp the code for printf in the stub function in the page 140. This can enable the application to call up printf by jumping to this internal stub printf. That stub can load the resolved printf pointer and jump to it to call printf. In some implementations, the dynamic linker can find the address of printf and stamp a pointer to the code for printf in the stub function in the page 140.

In some implementations, the dynamic linker 116 can identify the unresolved symbol references and create a data structure to store the names of the symbols and the associated links to resolve the unresolved symbol references, but the dynamic linker 116 does not resolve the unresolved symbol references. Instead, the dynamic linker 116 can hand down the data structure of the names of the symbols and the associated links to the kernel 114. In this way, the associated links can serve as placeholders for when the kernel resolves the symbol references using page-in linking as a page with an unresolved symbol reference is paged in.

II. Resolving Symbol References

A page-in linking system can resolve symbol references on pages of an executable (or executable code) using an on-demand infrastructure. The relationship between the kernel and the dynamic linker can enable improved computational and memory performance in resolving symbol references. Page-in linking can benefit from on-demand linking which can resolve symbol references as needed, rather than in anticipation of using the symbol definition associated with the symbol reference. These enhancements can enable an on-demand infrastructure.

A. Process Start-Up

As described herein, page-in linking enables an on-demand infrastructure for resolving symbol references. The on-demand infrastructure described herein enables significant memory and computational savings when an application is first started. Instead of having to page-in any requisite pages with unresolved symbol references upon process start-up because the page could be called at any time during the operation of the process, pages can be paged-in as their code and functionality is required. This reduces dirty memory from the startup of the process (or an application) and reduces computational costs associated with significant numbers of page-ins and page-outs.

Figure 3:
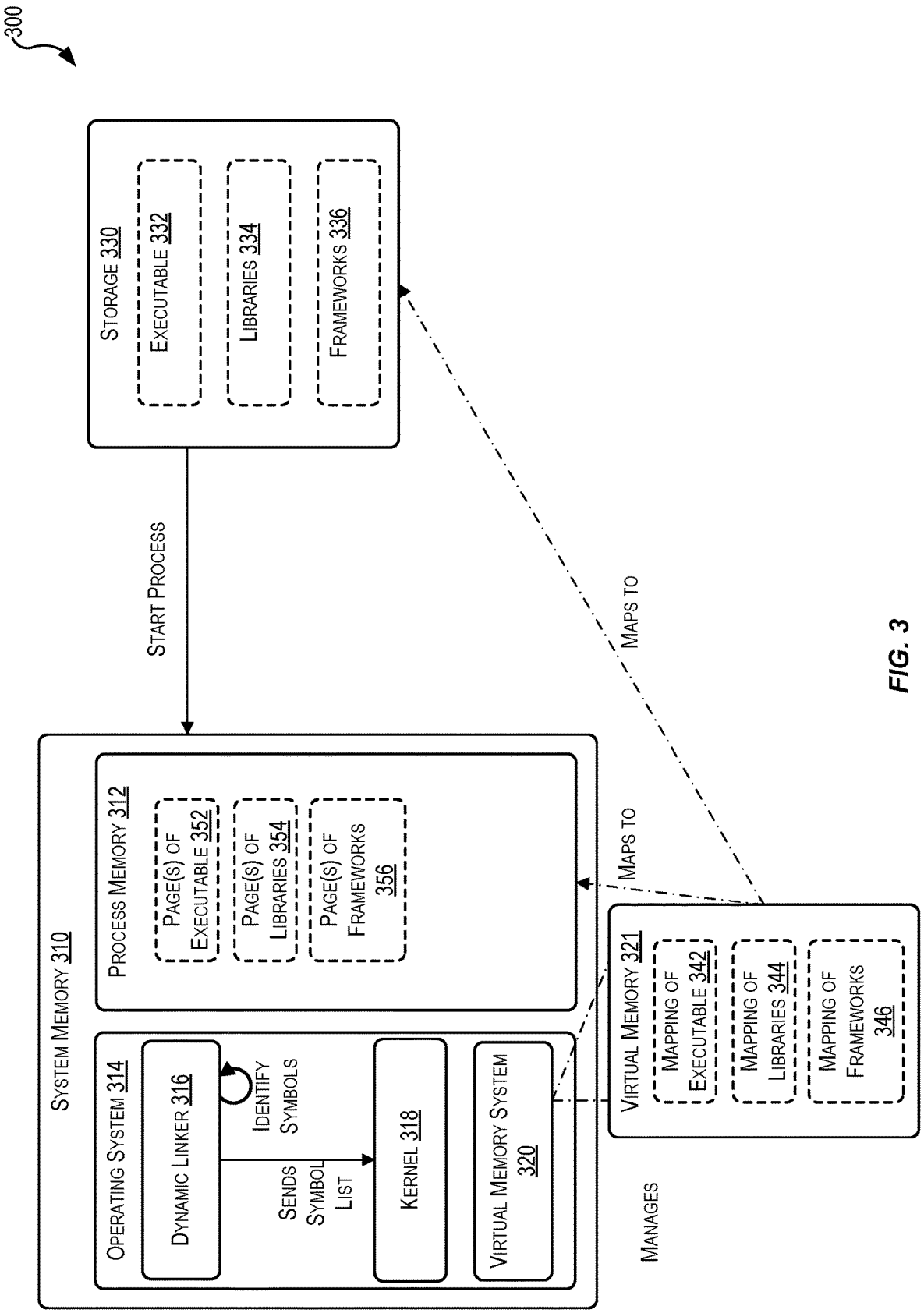
FIG. 3 illustrates a block diagram for illustrating the techniques described herein, according to an embodiment of the present disclosure.

FIG. 3 is an example diagram for illustrating part of the process of page-in linking. As described in FIG. 1, a user device or computing device can have a system for system memory 310. System memory 310 can include memory for an operating system 314 (for example, the operating system 114 of FIG. 1) and process memory 312 (for example, the process memory 112 of FIG. 1). The operating system 314 can include at least a dynamic linker 316 (for example, the dynamic linker 116 of FIG. 1), a kernel 318 (for example, the kernel 118 of FIG. 1), and a virtual memory system 320 (for example, the virtual memory system 120 of FIG. 1) which managed virtual memory 321 (for example, the virtual memory 121 of FIG. 1). The operating system 314, dynamic linker 316, and the kernel 318 are components that help the computing system run programs and applications. The virtual memory system 320 manages memory using virtual memory 321. The virtual memory 321 maps to process memory 312 and storage 330 (for example, disk or hard drive). The kernel can be associated with parts of system memory 310 that can be defined as kernel-related memory or wired memory. The dynamic linker 316 can be associated with handling parts of system memory 310, such as process memory 312 that can be defined as user memory or application memory, even if the dynamic linker 316 is stored in the operating system 314 portion of system memory 310.

A benefit of page-in linking can be seen upon start-up of a process. In particular, only pages being used at start-up of a process need to be brought into process memory 312. As described above, in some implementations, the dynamic linker 316 may bring in all pages that have unresolved symbol references (which can include pages of executable 352, pages of libraries 354, and pages of frameworks 356) upon process start-up. The dynamic linker 316 may bring in all pages that have unresolved symbol references in order to resolve the symbol references to their corresponding symbol definitions in anticipation of the process needing those properly resolved symbol references. Bringing in all these pages with unresolved symbol references can be computationally intensive and can use large amounts of computational resources (for example, instructions, computational cycles, use of buses, and the like) and process memory 312. Additionally, once the symbol references are resolved, as described herein, the process memory 312 may have to keep associated pages in process memory 312 and can't free up those portions of process memory 312 (without some other problem cropping up).

Figure 5:
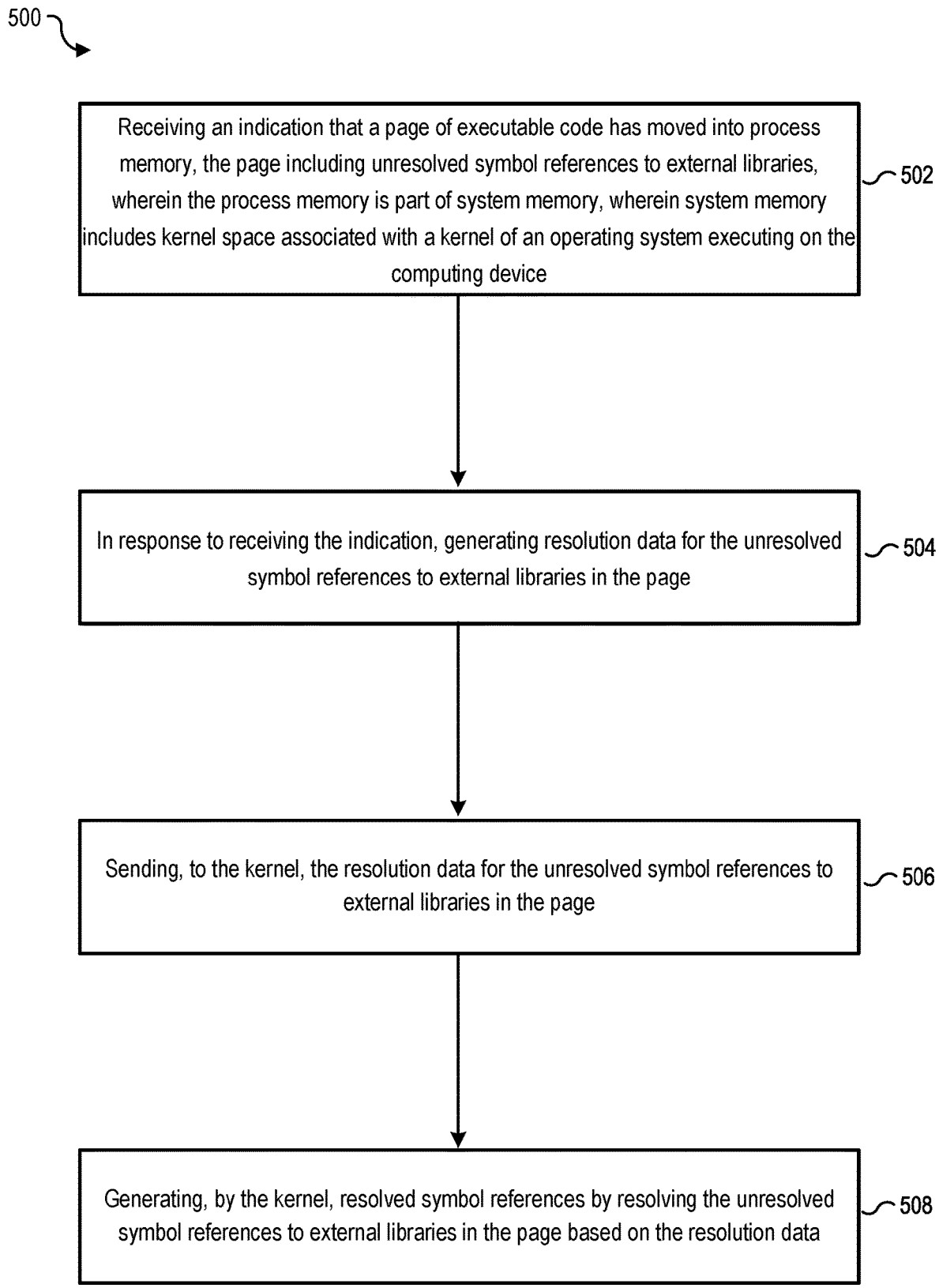
FIG. 5 illustrates a flow diagram for illustrating the techniques described herein, according to an embodiment of the present disclosure.

Page-in linking enables the dynamic linker 316 to identify unresolved symbol references, whether at process start-up or upon page-in of a page with unresolved symbol references, and the kernel 318 can resolve the symbol references upon page-in (as further described in FIG. 5). Upon start-up of a process, the virtual memory system 320 can create a mapping of the various parts of the process in virtual memory 321 without actually moving any parts of the process into process memory 312. The mappings of the various parts of the process in virtual memory 321 (for example, mapping of executable 342, mapping of libraries 344, and mapping of frameworks 346) can be organized in pages. Then when a page of the process is necessary for running a portion of the process, the virtual memory system 320 can check if the page has been paged into process memory 312. If the page of the process has not been paged into process memory 312, then the page can be paged in. If the page has already been paged in, then the process can continue to run as normal. When the page is paged into process memory 312, the unresolved symbol references associated with the page can be resolved by the kernel 318 as described herein.

B. On-Demand Linking During Page-In

Page-in linking enables on-demand linking of unresolved symbol references on a page during page-in. The dynamic linker can identify the unresolved symbol references and pass a symbol list to the kernel to resolve the symbol references as pages of code are paged-in. By enabling resolution of symbol references as pages of code are paged-in, the system can enable on-demand linking. On-demand linking focuses on only resolving symbol references when they are actually needed rather than resolving symbol references in anticipation of an eventual need, even if the symbol reference is never actually used during the process's lifetime.

Figure 4:
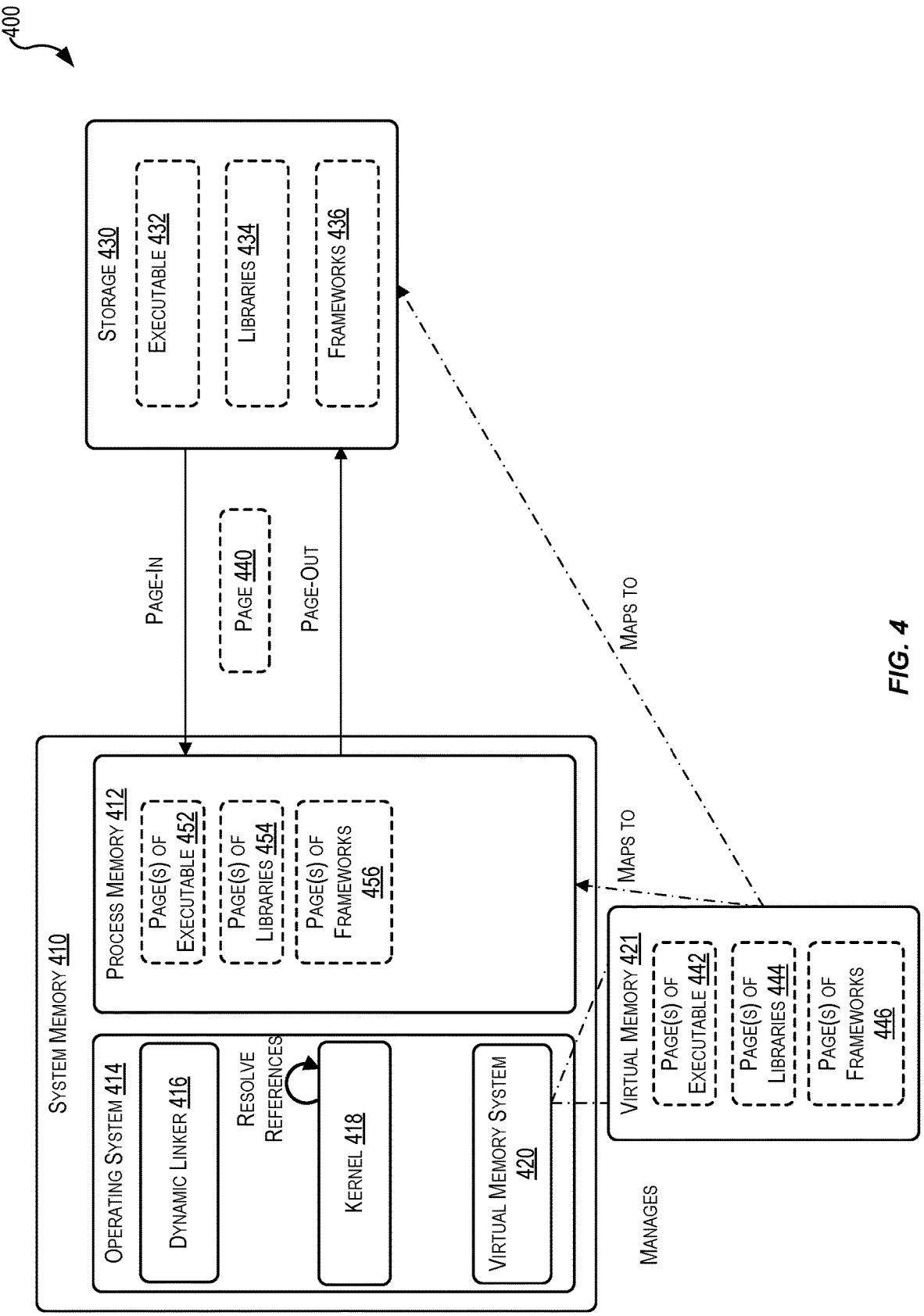
FIG. 4 illustrates a block diagram for illustrating the techniques described herein, according to an embodiment of the present disclosure.

FIG. 4 is an example diagram for illustrating another part of the process of page-in linking, namely the on-demand resolution of symbol references at page-in supported by page-in linking. As described in FIG. 1, a user device or computing device can have a system for system memory 410. System memory 410 can include memory for an operating system 414 (for example, the operating system 114 of FIG. 1) and process memory 412 (for example, the process memory 112 of FIG. 1). The operating system 414 can include at least a dynamic linker 416 (for example, the dynamic linker 116 of FIG. 1), a kernel 418 (for example, the kernel 118 of FIG. 1), and a virtual memory system 420 (for example, the virtual memory system 120 of FIG. 1) which managed virtual memory 421 (for example, the virtual memory 121 of FIG. 1). The operating system 414, dynamic linker 416, and the kernel 418 are components that help the computing system run programs and applications. The virtual memory system 420 manages memory using virtual memory 421. The virtual memory 421 maps to process memory 412 and storage 430 (for example, disk or hard drive).

As described herein, the kernel 418 can resolve the symbol references for the page 440 when the page 440 is paged into process memory 412. As described above in relation to FIG. 1, the page 440 can include symbol references to symbol definitions in other parts of code (for example, another page of the executable 432 or a library 434 such as a shared library). The symbol references need to be properly linked (also referred to as resolved) to a symbol definition by pointing to specific memory locations that will implement code associated with the symbol reference. At least some of the symbol references can be considered unresolved references. As described above, symbols can be objects, variables, functions, methods, and the like.

In some implementations, the dynamic linker 416 can perform two tasks. The dynamic linker 416 can also include the associated code for performing the two tasks. First, the dynamic linker 416 can determine unresolved symbol references (also referred to as linkage targets). The dynamic linker 416 can determine based on metadata in the page 440 which symbol references are unresolved. The metadata in the page 440 can include significant amounts of information including operation codes (opcodes) for resolving the symbol references. The dynamic linker 416 can handle any static parts of the metadata and distill the dynamic parts of the metadata down to minimize the amount of data that needs to be kept in memory for resolving the symbol references. The dynamic linker 416 uses the metadata to generate a data structure for storing the symbol names and placeholders for symbol definitions.

The dynamic linker 416 can determine which symbol references are to external libraries or frameworks. The dynamic linker 416 can also determine which symbol references are to other parts of the executable 432. The dynamic linker 416 can generate a data structure to include all the symbol references which need to be resolved. The data structure for the symbol references can include symbol names and where the code for the symbol definitions can be found. The data structure for the symbol references can be very small. The data structure can include all the targets that need to be linked.

In some implementations, the dynamic linker 416 performs a second task. The second task is to resolve the symbol references, by determining to where the symbol references should point in memory (for example, the symbol definitions). The dynamic linker 416 can determine a specific location in memory where the code associated with the symbol reference is stored. The dynamic linker 416 can then store the specific locations and the data structures for the symbol references in the user space (also known as application space) of system memory 410, which is oftentimes process memory 412.

In some implementations, the dynamic linker 416 does not perform the second task, but rather sends the targets (for example, in the data structure that includes the symbol names and placeholders for symbol definitions) to the kernel 418. The kernel can perform the second task of resolving the symbol references, by determining to where the symbol references should point in memory (for example, the symbol definitions). In this way, the kernel 418 can include operating code that allows it to resolve the symbol references. The kernel 418 can store the specific locations and data structures for the symbol references in kernel space (also known as wired memory) of system memory 410. The benefits of storing these references in kernel space (for example, wired memory) is described herein.

An example data structure for storing the list of symbol names and resolved symbol references is described below, for example, under heading III below.

Adding the functionality to the kernel 418 to bind the symbol references can increase performance and many benefits. However, the kernel's added functionality to bind the symbol references 258 can include costs to the overall system. In order to minimize those costs, the data structure for storing the resolved symbol references can be small. For example, the data structure for storing the resolved symbol references can lead to 10×-1000× (or more) virtual memory savings and 10×-1000× (or more) in computational savings.

In some implementations, page 440 can be paged out of process memory 412 via the virtual memory system 420. There are many well-understood reasons that page 440 could be paged out of process memory 410, namely that the virtual memory system 420 determines that other data needs to be stored in faster process memory 410 and page 440 can be moved to storage 430 because it is not presently needed. Some other reasons can include the process memory 412 may be full pages of actively running applications, or the page 440 does not seem to be needed because no associated code has been run for some predefined amount of time.

In some implementations, when the page 440 is paged out of process memory 412, page 440 is moved into the storage 430 by the virtual memory system 420 (for example, page 440 needs to be written to disk). In some implementations, when page 440 is paged out of process memory 412, no parts of page 440 that were updated are saved or moved into the storage 430. This is because the dynamic linker 416 and/or the kernel 418 can simply resolve the symbol references associated with page 440 again when the page 440 is paged into process memory 412 again (for example, re-paged-in), as described herein. This decreases dirty memory that can be attributed to the process and/or application associated with page 440. This is an example of how page-in linking enables on-demand infrastructure for linking and enables benefits for the page-in linking system.

C. Flowchart for Page-In Linking Using the Kernel

FIG. 5 illustrates a flow chart showing an example process 500 for page-in linking, according to at least one example. The process 500 can be performed by a page-in linking system which can include system memory, process memory, a dynamic linker, and a kernel.

Process 500 is illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

At block 502, an indication is received that a page of executable code has moved into process memory. The page can include unresolved symbol references. The executable code can be organized into pages. The process memory can be a part of system memory. System memory can include a kernel space associated with a kernel of an operating system executing on the computing device. The page can be associated with a process of a third-party application running on the computing device. Third-party applications can be associated with user space or application space of the system memory.

The unresolved symbol references can include unresolved symbol references to external libraries and/or external frameworks. The unresolved symbol references can include unresolved symbol references to another page of the executable code. The external libraries and/or external frameworks can be associated with process of an operating system or with process of applications developed by the developer of the operating system (for example, first party applications).

At block 504, process 500 includes, in response to receiving the indication, generating resolution data for the unresolved symbol references in the page. The resolution data can include a data structure (e.g., a table) of names and pointers. The names and pointers can be associated with the unresolved symbol references. The resolution data can be generated from metadata associated with the page. The metadata associated with the page can be generated by a static linker or compiler.

At block 506, process 500 includes sending, to the kernel, the resolution data for the unresolved symbol references in the page. The kernel can store the resolution data in kernel space, for example system memory associated with or allocated to the kernel.

At block 508, process 500 includes generating, by the kernel, resolved symbol references by resolving the unresolved symbol references in the page based at least on part on the resolution data. Resolving the references can include generating pointers to locations that have symbol definitions for the unresolved symbol references.

III. Table Data Structure from Page Metadata

As described herein, the metadata stored in the pages when the application object files is processed by the static linker. This metadata can be used by the dynamic linker (for example, the dynamic linker 116 of FIG. 1) and the kernel (for example, the kernel 118 of FIG. 1) to identify and resolve the unresolved symbol references associated with the page. The metadata stored in the pages can be used to create data structures (for example, resolution data) as described below in addition to as described in the U.S. patent publication 20190370459 which is incorporated by reference. Alternatively, the metadata can be used to create any data structure that is small enough to create meaningful efficiencies when sent down to the kernel 118 for the resolution of symbol references. As described herein, the data structure for the resolution of symbol references can include symbol names and symbol definitions. The symbol definitions portion of the data structure for the resolution of symbol references can have placeholders prior to resolution of the symbol references. The data structure for the resolution of symbol references can be referred to as the list of targets. As such, the dynamic linker can be described as generating the targets and resolving the targets.

Figure 6:
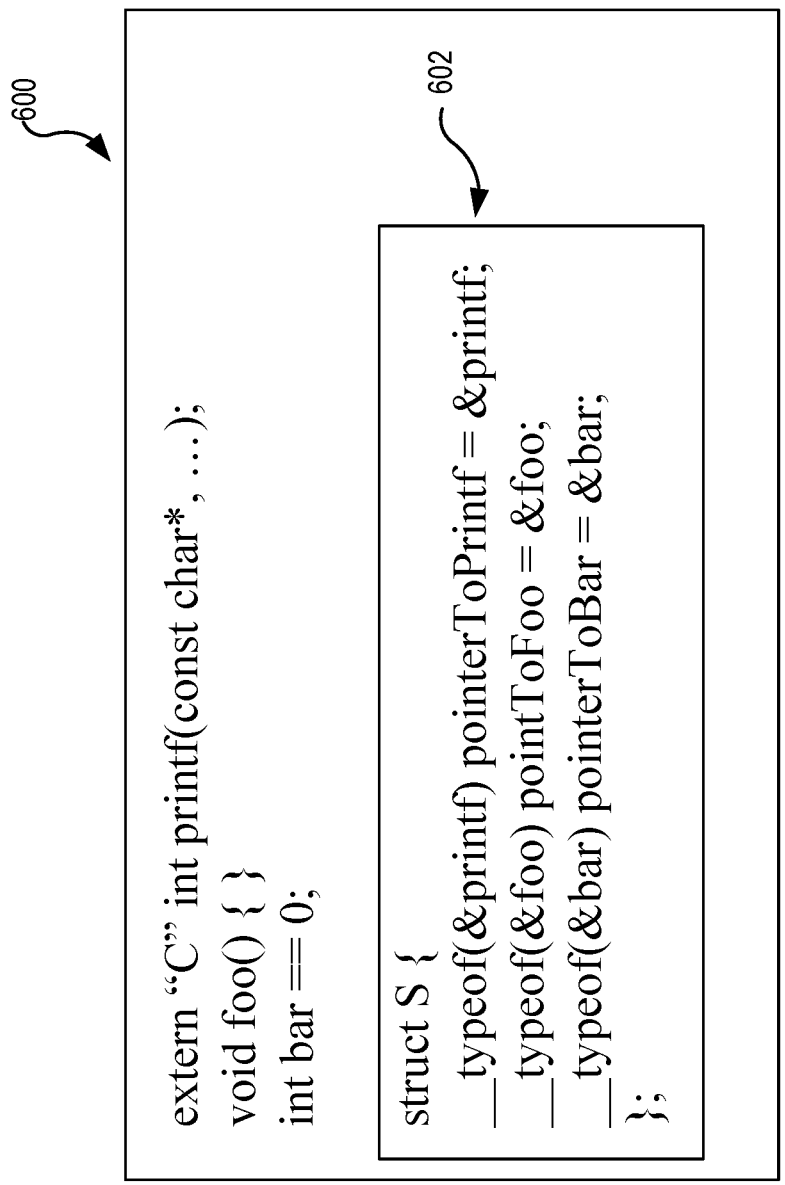
FIG. 6 illustrates a diagram for describing the techniques described herein, according to an embodiment of the present disclosure.

FIG. 6 illustrates an example implementation in which a code block 600 from a page (such as one of the pages 440 of FIG. 4) includes a global structure 602. Code block 600 can be processed to create a table structure 700 shown in FIG. 7. Code block 600 can be processed all or in part by a static linker. Code block 600 can be processed all or in part by the dynamic linker. Table structure 700 can also be the output of multiple systems including the static linker. The table structure 700 is dependent on the number of symbol references that need to be resolved. The table structure 700 can have a known size, even if the size is not fixed. Referring to FIG. 6, the example global structure 602 includes pointers to "printf", "foo", and "bar". "Printf" is external to the binary and will thus be accessed by a bind operation; thus printf is an external symbol reference to a library or framework. "Foo" and "bar" are within the binary and will be accessed via a rebase operation.

As shown in FIG. 7, table structure 700 includes a first component 710, having sub-components 712 corresponding to one or more rebases and subcomponent 714 corresponding to one or more binds. As described herein, rebases and binds are types of operations used to resolve symbol references. The first component 710 of the table structure 700 contains a name for unresolved symbol references, the address in memory where the row of the table structure 700 is stored, a value for what is stored in the table at that location, and a type of the value. When the table structure 700 is generated, the table includes information to resolve the symbol references associated with the rebases and binds. Once the symbol references are resolved, the table structure 700 can include the name of the symbol and a pointer to the memory location for code to resolve the symbol. For example, the pointer to the memory for code to resolve the symbol related to a function could be a pointer to where the function is defined in memory.

Additionally, table structure 700 includes a second component 720 having opcodes for the processing of the table structure 700. In a further embodiment, the byte code language in the opcodes describes how to generate a table data structure (or array), as well as instructions as to how to navigate the data structure. In some implementations the static linker (for example, the static linker 260 of FIG. 2) generates all or parts of table structure 700. In some implementations, the dynamic linker (for example, the dynamic linker 116 of FIG. 1) generates all or parts of structure 700.

The table structure 700 is subsequently executed during runtime to perform one or more linking (e.g., rebase/bind) operations to generate a linked list table data structure based on instructions included in components 710 and 720. Once executed, the table structure 700 can have all the resolved symbol references with the linking information. In some implementations the table structure 700 is executed by the dynamic linker (for example, the dynamic linker 116 of FIG. 1). In some implementations, the table structure 700 is executed by the kernel (for example, the kernel 118 of FIG. 1). When the table structure 700 is executed, the table structure 700 can include the name of the symbol and a pointer to the memory location for code to resolve the symbol.

IV. Resolving Symbol References

With reference to FIG. 3, the dynamic linker 316 can send the targets (for example, the symbol list and/or data structure for the symbol list) to the kernel 318. As noted above, the targets can be stored in any data structure that is small enough to create meaningful efficiencies when sent down to the kernel 318. For example, the data structures can be as described below in addition to as described in the U.S. patent publication 20190370459 which is again incorporated by reference. As noted above, both the kernel 318 and the dynamic linker 316 can resolve the symbol references.

When executing the table structure 700 of FIG. 7 for the resolution of symbol references (for example, to perform linking operations), the kernel 318 can begin at the first address in the table structure 700. The kernel 318 then examines the value at that address and the type of value to begin resolution of the symbol reference. For example, table structure 700 can begin with the bind operation of the second subcomponent 714 because it is located at the first address location of 0x100008000. The kernel 318 can then identify that the value for this operation is 0x4008000000000000 and the type of the value is a pointer. The kernel 318 can then resolve the pointer according to the description below.

Figure 8:
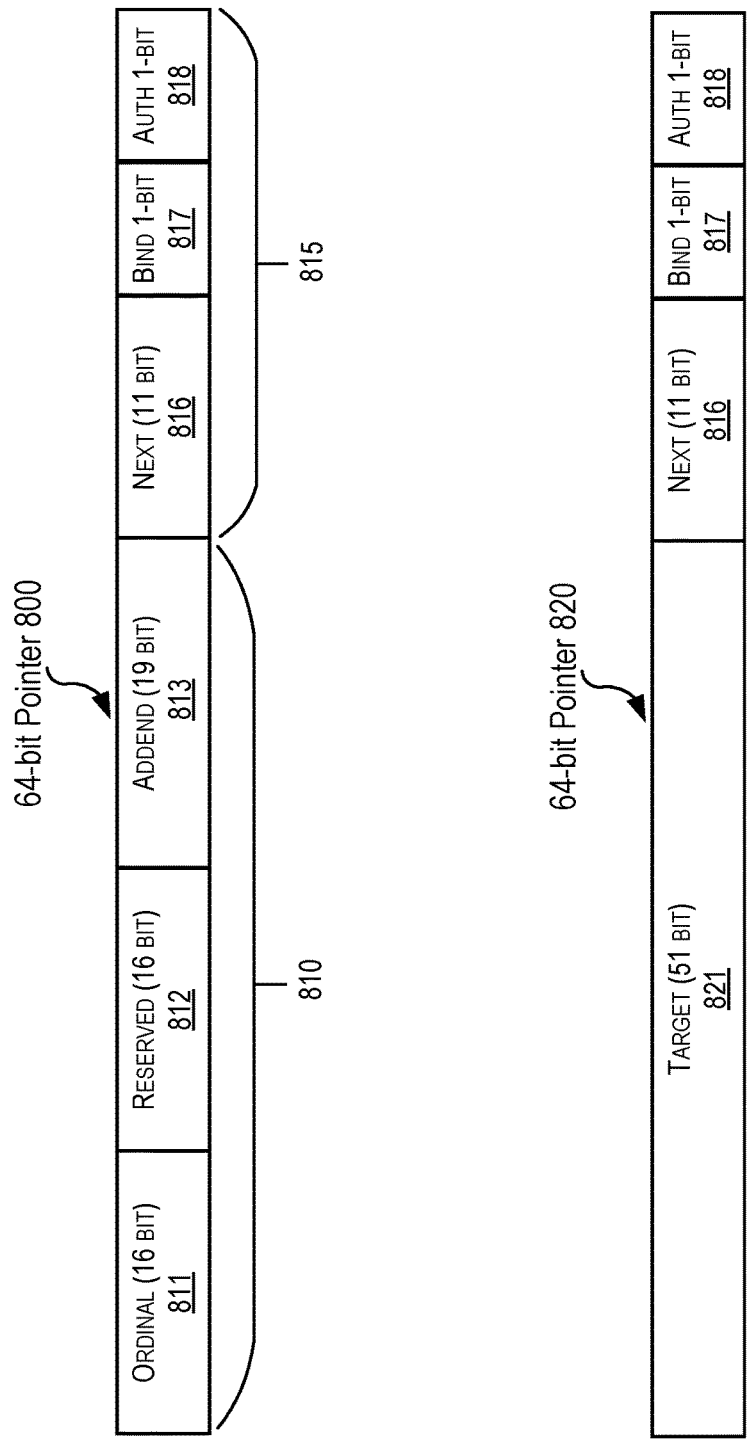
FIG. 8 illustrates a diagram for performing the techniques described herein, according to an embodiment of the present disclosure.

FIG. 8 illustrates two example implementations of a pointer data structure that can be used for resolving the symbol reference stored in a table structure. Each pointer data structure is 64-bits and includes information bits 810 and metadata bits 815. The information bits 810 is a 51-bit section and the metadata bits 815 is a 13-bit section. The bind bit 817 can be used to determine if the 64-bit pointer 800 is a pointer for a bind operation or a rebase operation.

Pointer data structure 800 is an example pointer data structure implemented for a bind operation (for example, the bind bit being set to "1"), for example for resolving symbol references to external libraries and/or frameworks. As shown in FIG. 8, pointer 800 is a 64-bit structure, including information bits 810 for ordinal bits 811, reserve bits 812, and addend bits 813, and metadata bits 815 that include next bits 816, a bind bit 817 and an authentication (auth) bit 818.

The ordinal bits 811 are implemented as a pointer to a table of binds. Addend bits 813 are implemented to determine a row in the table of binds. For example, for a table implemented as a "int array[4]," a request for "&array[2]" results in a bind to "array" with the addend bits set to 8 to represent that the desired value is 8 bytes (2 ints) from the start of the array.

The next bits 816 provide an offset to a next element in the chain. The bind bit 817 indicates whether an operation to be performed is a bind or rebase, while auth bit 818 indicates whether the pointer is to be authenticated.

In one embodiment, the pointer analysis includes analyzing the metadata component to determine whether the linking operation is a rebase or bind. With reference to FIG. 7, thus, to process the "printf" bind shown in sub-component 714 using pointer structure 800, the value is analyzed to acquire ordinal=0; addend=0; next=1; bind=1; and auth=0. The bind=1 value indicates that a bind is to be performed, while auth=0 indicates that a conventional bind implementation without authentication is performed.

The linking operation (e.g., rebase or bind) is processed according to the indication provided by the bind bit. In one embodiment, the ordinal is used to look up a table of binds. Subsequently, the information from the table is used to find the address of "printf" and write the address to the indicated address location. In one embodiment, the next opcode to be processed can be determined based on the next bits 816 includes in the pointer metadata component. With reference to FIG. 7, the next bits 816 in the "printf" pointer indicates a 1, the value is multiplied by 8 (e.g., that binds are aligned to 8-bytes for the alignment of a pointer on 64-bit architectures) to obtain the offset to the next element of the chain. This offset leads to the rebase (_DATA_data 0x100008008 pointer 0x100007F94 with value 0x0008000100007F94) indicated in sub-component 712.

FIG. 8 also illustrates an implementation of a pointer data structure 820 implemented for a rebase operation. In this embodiment, a 64-bit pointer structure 820 includes target bits 821, in addition to the next bits 816, bind bit 817, and auth bit 818 in the metadata component. With reference to FIG. 7, The target 0x100007F94 points to "foo" before a binary slide is performed at runtime. To perform a rebase operation, the runtime slide from where the binary was loaded is added to 0x100007F94, and subsequently stored back to the address location. The next bits 816 again have a value of 1 that is multiplied by 8 to get next location in the chain, which is (DATA_data 0x100008010 pointer 0x100008018 with value 0x0000000100008018). This is another rebase, which points to 0x100008018. Thus, the value is again slid and stored. Here the next bits 816 have a value of 0 that indicates the end of the chain.

In some implementations, the maximum size of a single image of the binary or a single page of the binary is limited to four kilobytes.

V. Security Features Related to the Kernel and Dynamic Linker

In some implementations, the page-in linking system may include additional optional security features. For example, the dynamic linker can be capable of resolving symbol references if the kernel is unable or should not be used to resolve symbol references. In some implementations, only symbol references to certain known libraries upon launch of an application can be resolved by the kernel. Dynamically loading new pages of new executables related to the application after application code has run can lead to an attack or a tamper surface associated with the kernel. In some implementations, a call is made to the kernel that shuts down the capability to resolve symbol references in new pages under such circumstances. This would lead to the dynamic linker resolving symbol references in the user space of virtual memory for the newly loaded pages.

In some implementations, a high security mode can be implemented that disables the handing down of targets from the dynamic linker to the kernel. In such situations, the high security mode can lead to reduced performance.

VI. Example Device

Figure 9:
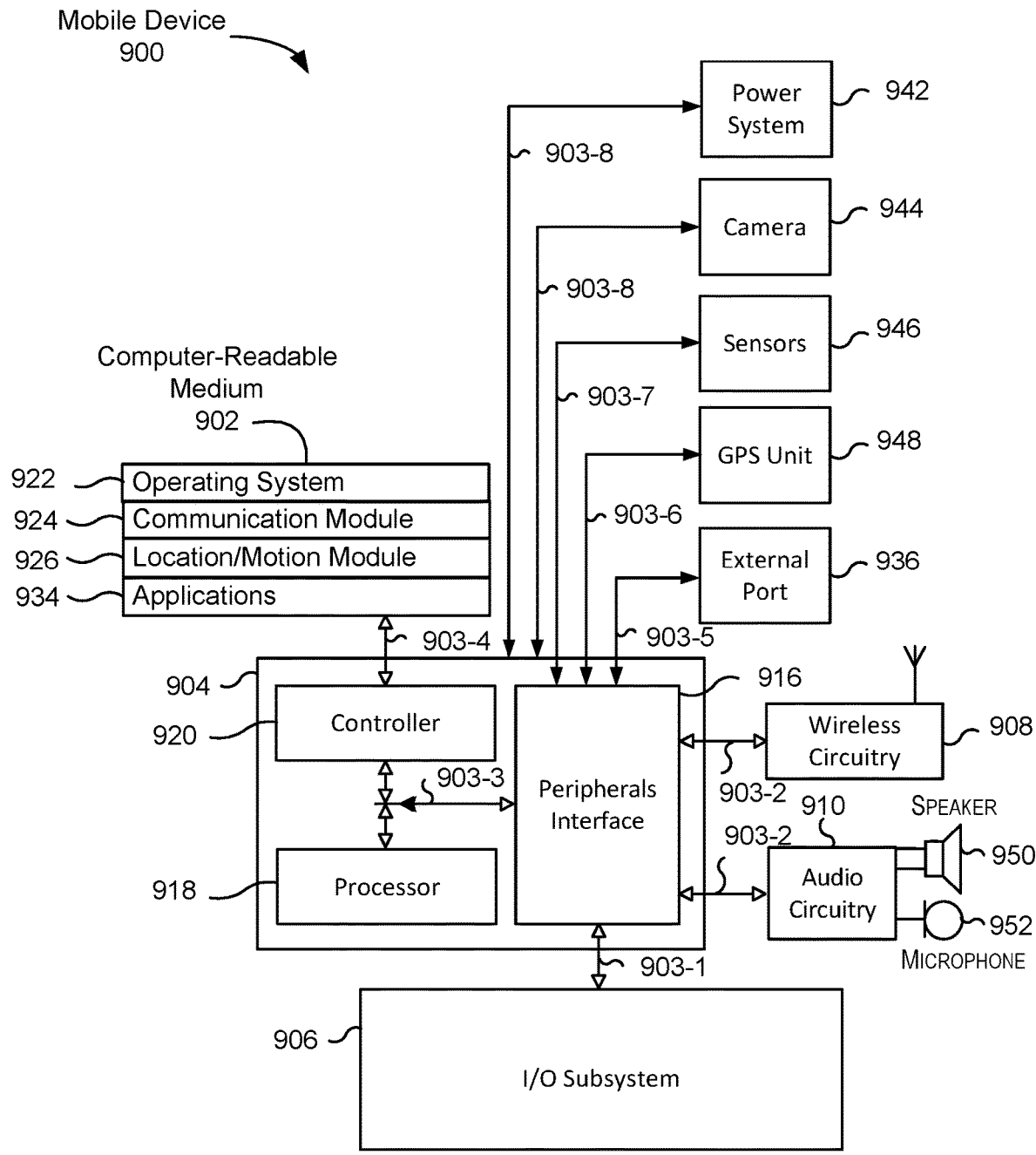
FIG. 9 illustrates a block diagram for performing the techniques described herein, according to an embodiment of the present disclosure.

FIG. 9 is a block diagram of an example electronic device 900. Device 900 generally includes computer-readable medium 902, a processing system 904, an Input/Output (I/O) subsystem 906, wireless circuitry 908, and audio circuitry 910 including speaker 912 and microphone 914. These components may be coupled by one or more communication buses or signal lines 903. Device 900 can be any portable electronic device, including a handheld computer, a tablet computer, a mobile phone, laptop computer, tablet device, media player, personal digital assistant (PDA), a key fob, a car key, an access card, a multifunction device, a mobile phone, a portable gaming device, a headset, or the like, including a combination of two or more of these items.

It should be apparent that the architecture shown in FIG. 9 is only one example of an architecture for device 900, and that device 900 can have more or fewer components than shown, or a different configuration of components. The various components shown in FIG. 9 can be implemented in hardware, software, or a combination of both hardware and software, including one or more signal processing and/or application specific integrated circuits.

Wireless circuitry 908 is used to send and receive information over a wireless link or network to one or more other devices' conventional circuitry such as an antenna system, a radio frequency (RF) transceiver, one or more amplifiers, a tuner, one or more oscillators, a digital signal processor, a coder-decoder (CODEC) chipset, memory, etc. Wireless circuitry 908 can use various protocols, e.g., as described herein. In various embodiments, wireless circuitry 908 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, Wi-Fi (such as Institute of Electrical and Electronics Engineers (IEEE) 802.11a, IEEE 802.11b, IEEE 802.11g and/or IEEE 802.11n), Bluetooth, Wi-MAX, Voice Over Internet Protocol (VoIP), near field communication protocol (NFC), a protocol for email, instant messaging, and/or a short message service (SMS), or any other suitable communication protocol, including communication protocols not yet developed as of the filing date of this document.

Wireless circuitry 908 is coupled to processing system 904 via peripherals interface 916. Peripherals interface 916 can include conventional components for establishing and maintaining communication between peripherals and processing system 904. Voice and data information received by wireless circuitry 908 (e.g., in speech recognition or voice command applications) is sent to one or more processors 918 via peripherals interface 916. One or more processors 918 are configurable to process various data formats for one or more application programs 934 stored on medium 902.

Peripherals interface 916 couple the input and output peripherals of device 900 to the one or more processors 918 and computer-readable medium 902. One or more processors 918 communicate with computer-readable medium 902 via a controller 920. Computer-readable medium 902 can be any device or medium that can store code and/or data for use by one or more processors 918. Computer-readable medium 902 can include a memory hierarchy, including cache, main memory and secondary memory. The memory hierarchy can be implemented using any combination of a random-access memory (RAM) (e.g., static random access memory (SRAM) dynamic random access memory (DRAM), double data random access memory (DDRAM)), read only memory (ROM), FLASH, magnetic and/or optical storage devices, such as disk drives, magnetic tape, CDs (compact disks) and DVDs (digital video discs). In some embodiments, peripherals interface 916, one or more processors 918, and controller 920 can be implemented on a single chip, such as processing system 904. In some other embodiments, they can be implemented on separate chips.

Processor(s) 918 can include hardware and/or software elements that perform one or more processing functions, such as mathematical operations, logical operations, data manipulation operations, data transfer operations, controlling the reception of user input, controlling output of information to users, or the like. Processor(s) 918 can be embodied as one or more hardware processors, microprocessors, microcontrollers, field programmable gate arrays (FPGAs), application-specified integrated circuits (ASICs), or the like.

Device 900 also includes a power system 942 for powering the various hardware components. Power system 942 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 900 includes a camera 944. In some embodiments, device 900 includes sensors 946. Sensors can include accelerometers, compass, gyrometer, pressure sensors, audio sensors, light sensors, barometers, and the like. Sensors 946 can be used to sense location aspects, such as auditory or light signatures of a location.

In some embodiments, device 900 can include a GPS receiver, sometimes referred to as a GPS unit 948. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 918 run various software components stored in medium 902 to perform various functions for device 900. In some embodiments, the software components include an operating system 922, a communication module 924 (or set of instructions), a location module 926 (or set of instructions), and other application programs 934 (or set of instructions).

Operating system 922 can be any suitable operating system, including iOS, Mac OS, Darwin, Real Time Operating System (RTXC), LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

The operating system 922 can include a dynamic linker and a kernel as described above. The dynamic linker and/or the kernel can resolve references, as described above, when pages of applications are brought into the computer-readable medium 902 (which can be referred to as memory). These references can be references to other pages of applications or to external libraries/frameworks. For example, a page could reference code in an external library on the mobile device 900 related to the camera 944 or the sensors 946.

Communication module 924 facilitates communication with other devices over one or more external ports 936 or via wireless circuitry 908 and includes various software components for handling data received from wireless circuitry 908 and/or external port 936. External port 936 (e.g., universal serial bus (USB), FireWire, Lightning connector, 60-pin connector, etc.) is adapted for coupling directly to other devices or indirectly over a network (e.g., the Internet, wireless local area network (LAN), etc.).

Location/motion module 926 can assist in determining the current position (e.g., coordinates or other geographic location identifiers) and motion of device 900. Modern positioning systems include satellite-based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 926 receives data from GPS unit 948 and analyzes the signals to determine the current position of the mobile device. In some embodiments, location/motion module 926 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 908 and is passed to location/motion module 926. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 900 based on the position coordinates of the corresponding transmitters. Regardless of the specific location technology used, location/motion module 926 receives information from which a location fix can be derived, interprets that information, and returns location information, such as geographic coordinates, latitude/longitude, or other location fix data The one or more applications 934 on device 900 can include any applications installed on the device 900, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

I/O subsystem 906 can be coupled to a display system (not shown), which can be a touch-sensitive display. The display displays visual output to the user in a graphical user interface (GUI). The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 906 can include a display and user input devices such as a keyboard, mouse, and/or trackpad. In some embodiments, I/O subsystem 906 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 902) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 906 can be coupled to one or more other physical control devices (not shown), such as push-buttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 900 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display, or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present disclosure may be created using a data signal encoded with such programs. Computer readable media encoded with the program code may be packaged with a compatible device or provided separately from other devices (e.g., via Internet download). Any such computer readable medium may reside on or within a single computer program product (e.g., a hard drive or an entire computer system), and may be present on or within different computer program products within a system or network. A computer system may include a monitor, printer, or other suitable display for providing any of the results mentioned herein to a user.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g., a solid-state drive, a hard drive, a CD, or an entire computer system), and may be present on or within different computer products within a system or network. A computer system may include a monitor, printer, or other suitable display for providing any of the results mentioned herein to a user.

As described above, one aspect of the present technology is the gathering, sharing, and use of data, including an authentication tag and data from which the tag is derived. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to authenticate another device, and vice versa to control which devices ranging operations may be performed. Further, other uses for personal information data that benefit the user are also contemplated by the present disclosure. For instance, health and fitness data may be shared to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sharing content and performing ranging, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Systems and methods for page-in linking are described herein. In the description throughout this application, numerous specific details are set forth. However, it is understood that implementations of the invention may be practiced without these specific details. In other instances, well-known circuits, structures and techniques have not been shown in detail in order not to obscure the understanding of this description. Note that in this description, references to "one implementation," "an implementation," "one embodiment" or "an embodiment" mean that the feature being referred to is included in at least one implementation or embodiment of the invention. Further, separate references to "one embodiment" or "one implementation" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments or implementations described herein. Moreover, in this description, the phrase "exemplary embodiment" or "exemplary implementation" means that the embodiment being referred to serves as an example or illustration.

Herein, block diagrams illustrate exemplary implementations and embodiments of the invention. Also herein, flow diagrams illustrate operations of the exemplary implementations and embodiments of the invention. The operations of the flow diagrams will be described with reference to the exemplary implementations and embodiments shown in the block diagrams. However, it should be understood that the operations of the flow diagrams could be performed by implementations or embodiments of the invention other than those discussed with reference to the block diagrams, and implementations and embodiments discussed with references to the block diagrams could perform operations different than those discussed with reference to the flow diagrams.

Although the present disclosure has been described with respect to specific embodiments, it will be appreciated that the disclosure is intended to cover all modifications and equivalents within the scope of the following claims.

All patents, patent applications, publications, and descriptions mentioned herein are incorporated by reference in their entirety for all purposes. None is admitted to be prior art.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure. The use of "or" is intended to mean an "inclusive or," and not an "exclusive or" unless specifically indicated to the contrary. Reference to a "first"

component does not necessarily require that a second component be provided. Moreover, reference to a "first" or a "second" component does not limit the referenced component to a particular location unless expressly stated. The term "based on" is intended to mean "based at least in part on."

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The specific details of particular embodiments may be combined in any suitable manner or varied from those shown and described herein without departing from the spirit and scope of embodiments of the disclosure.

The above description of exemplary embodiments of the disclosure has been presented for the purposes of illustration and description. It is not intended to be exhaustive or to limit the disclosure to the precise form described, and many modifications and variations are possible in light of the teaching above. The embodiments were chosen and described in order to best explain the principles of the disclosure and its practical applications to thereby enable others skilled in the art to best utilize the disclosure in various embodiments and with various modifications as are suited to the particular use contemplated.

All references, including publications, patent applications, and patents, cited herein are hereby incorporated by reference to the same extent as if each reference were individually and specifically indicated to be incorporated by reference and were set forth in its entirety herein.

What is claimed is:

1. A method performed by a computing device, comprising:
    initiating an execution of an executable that includes a page of executable code;
    receiving an indication that the page of the executable code has moved into a process memory from a storage, wherein the page of the executable code includes unresolved symbol references to external libraries, wherein the process memory is part of a system memory, and wherein the system memory includes kernel space associated with a kernel of an operating system executing on the computing device;
    in response to receiving the indication, generating resolution data for the unresolved symbol references to the external libraries in the page of the executable code;
    sending, to the kernel of the operating system, the resolution data for the unresolved symbol references to the external libraries in the page of the executable code; and
    generating, by the kernel of the operating system, resolved symbol references by linking the unresolved symbol references to the external libraries in the page of the executable code based on the resolution data for the unresolved symbol references to the external libraries in the page of the executable code.

2. The method of claim 1, further comprising storing, by the kernel of the operating system, the resolution data for the unresolved symbol references to the external libraries in the page of the executable code in the kernel space.

3. The method of claim 1, wherein resolving the unresolved symbol references in the page of the executable code includes generating pointers to locations that have corresponding symbol definitions.

4. The method of claim 1, wherein the page of the executable code is associated with a third-party application running on the operating system associated with the kernel.

5. The method of claim 1, wherein the process memory further includes user space for third-party applications.

6. The method of claim 1, wherein the resolution data for the unresolved symbol references to the external libraries in the page of the executable code is generated from metadata in the page of the executable code.

7. The method of claim 6, wherein the metadata in the page of the executable code is generated by a static linker.

8. The method of claim 1, wherein the indication that the page of the executable code has moved into the process memory from the storage is after a start-up of a third-party application.

9. The method of claim 1, wherein the indication that the page of the executable code has moved into the process memory from the storage is associated with the page of the executable code being moved into the process memory from the storage another time.

10. A non-transitory computer-readable medium storing computer-executable instructions that, when executed by one or more processors, cause the one or more processors to perform operations comprising:
    initiating an execution of an executable that includes a page of executable code;
    receiving a first indication that the page of the executable code has moved into a process memory from a storage, wherein the page of the executable code includes a first set of unresolved symbol references to external libraries, wherein the process memory is part of a system memory, and wherein the system memory includes kernel space associated with a kernel of an operating system executing on a computing device;
    in response to receiving the first indication, generating first resolution data for the first set of unresolved symbol references to the external libraries in the page of the executable code;
    sending, to the kernel of the operating system, the first resolution data for the first set of unresolved symbol references to the external libraries in the page of the executable code; and
    generating, by the kernel of the operating system, a first set of resolved symbol references by linking the first set of unresolved symbol references to the external libraries in the page of the executable code based on the first resolution data for the first set of unresolved symbol references to the external libraries in the page of the executable code.

11. The non-transitory computer-readable medium of claim 10, further storing computer-executable instructions that, when executed by the one or more processors, cause the one or more processors to further perform operations comprising:
receiving an indication that the page of the executable code has moved out of the process memory; and
marking each resolved symbol reference of the first set of resolved symbol references as an unresolved symbol reference.

12. The non-transitory computer-readable medium of claim 11, further storing computer-executable instructions that, when executed by the one or more processors, cause the one or more processors to further perform operations comprising:
receiving a second indication that the page of the executable code has moved into the process memory from the storage, wherein the page of the executable code includes a second set of unresolved symbol references corresponding to the first set of unresolved symbol references;
in response to receiving the second indication, generating second resolution data for the second set of unresolved symbol references to the external libraries in the page of the executable code;
sending, to the kernel of the operating system, the second resolution data for the second set of unresolved symbol references to the external libraries in the page of the executable code; and
generating, by the kernel of the operating system, a second set of resolved symbol references by linking the second set of unresolved symbol references to the external libraries in the page of the executable code based on the second resolution data for the second set of unresolved symbol references to the external libraries in the page of the executable code.

13. The non-transitory computer-readable medium of claim 10, wherein the first resolution data for the first set of unresolved symbol references to the external libraries in the page of the executable code includes types of unresolved symbol references.

14. A computerized system, comprising:
a memory configured to store computer-executable instructions; and
a processor configured to access the memory and execute the computer-executable instructions to cause the computerized system to:
initiate an execution of an executable that includes a page of executable code;
receive an indication that the page of the executable code has moved into a process memory from a storage, wherein the page of the executable code includes unresolved symbol references to external libraries, wherein the process memory is part of a system memory, and wherein the system memory includes kernel space associated with a kernel of an operating system executing on a computing device;
in response to receiving the indication, generate resolution data for the unresolved symbol references to the external libraries in the page of the executable code;
send, to the kernel of the operating system, the resolution data for the unresolved symbol references to the external libraries in the page of the executable code; and
generate, by the kernel of the operating system, resolved symbol references by linking the unresolved symbol references to the external libraries in the page of the executable code based on the resolution data for the unresolved symbol references to the external libraries in the page of the executable code.

15. The computerized system of claim 14, wherein the resolution data for the unresolved symbol references to the external libraries in the page of the executable code includes a table of symbol names and pointers, and wherein the symbol names and pointers are associated with the unresolved symbol references to the external libraries in the page of the executable code.

16. The computerized system of claim 15, wherein at least one pointer of the pointers in the table is used to resolve an unresolved symbol reference to an external library in the page of the executable code.

17. The computerized system of claim 15, wherein at least one pointer of the pointers in the table includes an offset for the page of the executable code to resolve at least one unresolved symbol reference to an external library in the page of the executable code.

18. The computerized system of claim 15, wherein at least one pointer of the pointers in the table includes an offset to a next pointer in the table.

19. The computerized system of claim 14, wherein the resolution data for the unresolved symbol references to the external libraries in the page of the executable code is generated by a dynamic linker.

20. The computerized system of claim 14, wherein the unresolved symbol references to the external libraries in the page of the executable code include symbol references to another page of the executable code.

* * * * *